United States Patent
Chazono et al.

(10) Patent No.: US 6,614,644 B2
(45) Date of Patent: Sep. 2, 2003

(54) MULTILAYER CERAMIC CAPACITOR AND METHOD FOR THE MANUFACTURE THEREOF

(75) Inventors: Hirokazu Chazono, Tokyo (JP); Hisamitsu Shizuno, Tokyo (JP); Hiroshi Kishi, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/785,064

(22) Filed: Feb. 15, 2001

(65) Prior Publication Data

US 2001/0055193 A1 Dec. 27, 2001

(30) Foreign Application Priority Data

Feb. 16, 2000 (JP) ................................................. 37542
Feb. 16, 2000 (JP) ................................................. 37544
Feb. 16, 2000 (JP) ................................................. 37545

(51) Int. Cl.[7] ............................. H01G 4/06; H01G 4/20; B32B 9/00
(52) U.S. Cl. ..................... 361/321.2; 361/312; 428/469
(58) Field of Search ................................. 361/211, 312, 361/320, 321.1–321.5; 428/469, 471, 209

(56) References Cited

U.S. PATENT DOCUMENTS

| | | | | |
|---|---|---|---|---|
| 5,225,960 A | * | 7/1993 | Kishi et al. ................. 29/25.42 |
| 5,335,139 A | * | 8/1994 | Nomura et al. ............ 361/321.4 |
| 5,668,694 A | * | 9/1997 | Sato et al. ................... 257/295 |
| 5,790,367 A | * | 8/1998 | Mateika et al. ........... 361/321.4 |
| 5,977,006 A | * | 11/1999 | Iguchi et al. ................ 501/137 |
| 6,078,494 A | * | 6/2000 | Hansen ...................... 361/321.5 |
| 6,292,354 B1 | * | 9/2001 | Kobayashi et al. ....... 361/321.2 |

* cited by examiner

Primary Examiner—Dean A. Reichard
Assistant Examiner—Eric Thomas
(74) Attorney, Agent, or Firm—Katten Muchin Zavis Rosenman

(57) ABSTRACT

A multilayer ceramic capacitor includes sintered laminated bodies having a plurality of dielectric layers alternately stacked with a multiplicity of internal electrodes, and a pair of external electrodes electrically coupled to the internal electrodes. The dielectric layer is of sintered ceramic grains. The ceramic grains include a core portion surrounded by a shell portion or a solid solution. The ceramic grains contain additive elements such as acceptor elements and/or rare earth elements. The additive elements are non-uniformly distributed in the core and/or shell portion of the ceramic grain or in the solid solution. Such non-uniform distribution of the additive elements in ceramic grains promotes or facilitates the re-oxidation process of the ceramic grains and also increases electrical resistance thereof. Accordingly, the operating life characteristics of the multilayer ceramic capacitors, especially those incorporating therein thin dielectric layers, can be improved. As a result, the thickness of dielectric layers can be further reduced and a greater number of dielectric layers can be used in forming multilayer ceramic capacitors, enabling miniaturization and large capacitance thereof to be achieved.

18 Claims, 4 Drawing Sheets

MULTILAYER CERAMIC CAPACITOR AND METHOD FOR THE MANUFACTURE THEREOF

FIELD OF THE INVENTION

The present invention relates to a multilayer ceramic capacitor and a method for the manufacture thereof; and, more particularly, to a miniaturized large capacitance multilayer ceramic capacitor with an improved reliability and an increased operating life, and a method for manufacturing same, wherein the improvement of reliability and operating life is achieved by employing ceramic particles having greater electrical resistance in forming dielectric layers and the improvement of size and capacitance is achieved by scaling down the thickness of such dielectric layers and stacking a greater number of thus scaled down layers.

BACKGROUND OF THE INVENTION

In general, a multilayer ceramic capacitor 40 includes a ceramic body 42 having a pair of external electrodes 44 respectively formed at two opposite end portions thereof. The ceramic body 42 is fabricated by sintering a laminated body formed of alternately stacked dielectric layers 46 and internal electrodes 48. Each pair of neighboring internal electrodes 48 faces each other with a dielectric layer 46 intervened therebetween and is electrically coupled to different external electrodes 44, respectively, as shown in FIG. 4.

The dielectric layer is made of a reduction resistive ceramic material including, e.g., barium titanate (BT) as a major component, and an oxide of rare-earth metal and/or a compound of such acceptor type element as Mn, V, Cr, Mo, Fe, Ni, Cu, Co. The term "reduction resistive ceramic material" used herein represents a ceramic material not being readily deoxidized in a non-oxidative atmosphere but easily oxidized by firing in an oxidative atmosphere. The internal electrodes are formed by sintering a conductive paste whose main component is, for example, Ni metal powder.

The ceramic body is formed by: forming a chip-shaped laminated body with alternately stacked ceramic green sheets and patterned internal electrodes; removing a binder off the chip-shaped laminated body; sintering the binder removed laminated body in a non-oxidative atmosphere at a high temperature ranging from 1200° C. to 1300° C.; and finally re-oxidizing the sintered laminated body in the oxidative atmosphere.

Recent trend for ever more miniaturized and dense electric circuits demands for a further scaled down multilayer ceramic capacitor with higher capacitance. Keeping up with such demand, there has been made an effort to fabricate thinner dielectric layers and to stack a greater number of the thus produced dielectric layers.

However, when the dielectric layers of the multilayer ceramic capacitor are thinned out, dielectric breakdown in the layers between internal electrodes can easily occur since the electric field intensity per unit thickness increases. Accordingly, the operating life of the multilayer ceramic capacitor becomes shortened and the reliability in the electrical characteristic of the capacitor is also deteriorated.

SUMMARY OF THE INVENTION

It is, therefore, an object of the present invention to provide a multilayer ceramic capacitor of a highly miniaturized size and lengthened operating life by increasing the electrical resistance of ceramic grains formed in dielectric layers.

It is another object of the present invention to provide a method for manufacturing same.

In accordance with one aspect of the present invention, there is provided a multilayer ceramic capacitor, comprising: a plurality of dielectric layers; a multiplicity of internal electrodes alternately stacked with the dielectric layers; and a pair of external electrodes connected to the internal electrodes, wherein the dielectric layers includes ceramic grains, the ceramic grains having a main component and one or more additive elements, the additive elements being non-uniformly distributed in the ceramic grains.

In accordance with another aspect of the present invention, there is provided a method for manufacturing a multilayer ceramic capacitor, comprising the steps of: preparing a ceramic material having a main substance and one or more additive elements, the additive elements being distributed inside of the main substance; forming ceramic green sheets by using the prepared ceramic material; coating internal electrode patterns on the ceramic green sheets; stacking the ceramic green sheets including the internal electrode patterns; dicing the stacked ceramic green sheets to form chip-shaped laminated bodies; and sintering the chip-shaped laminated bodies.

BRIEF DESCRIPTION OF THE DRAWINGS

The above and other objects and features of the present invention will become apparent from the following description of preferred embodiments given with reference to the accompanying drawings in which.

DETAILED DESCRIPTION OF THE PREFERRED EMBODIMENT

Figure 1:
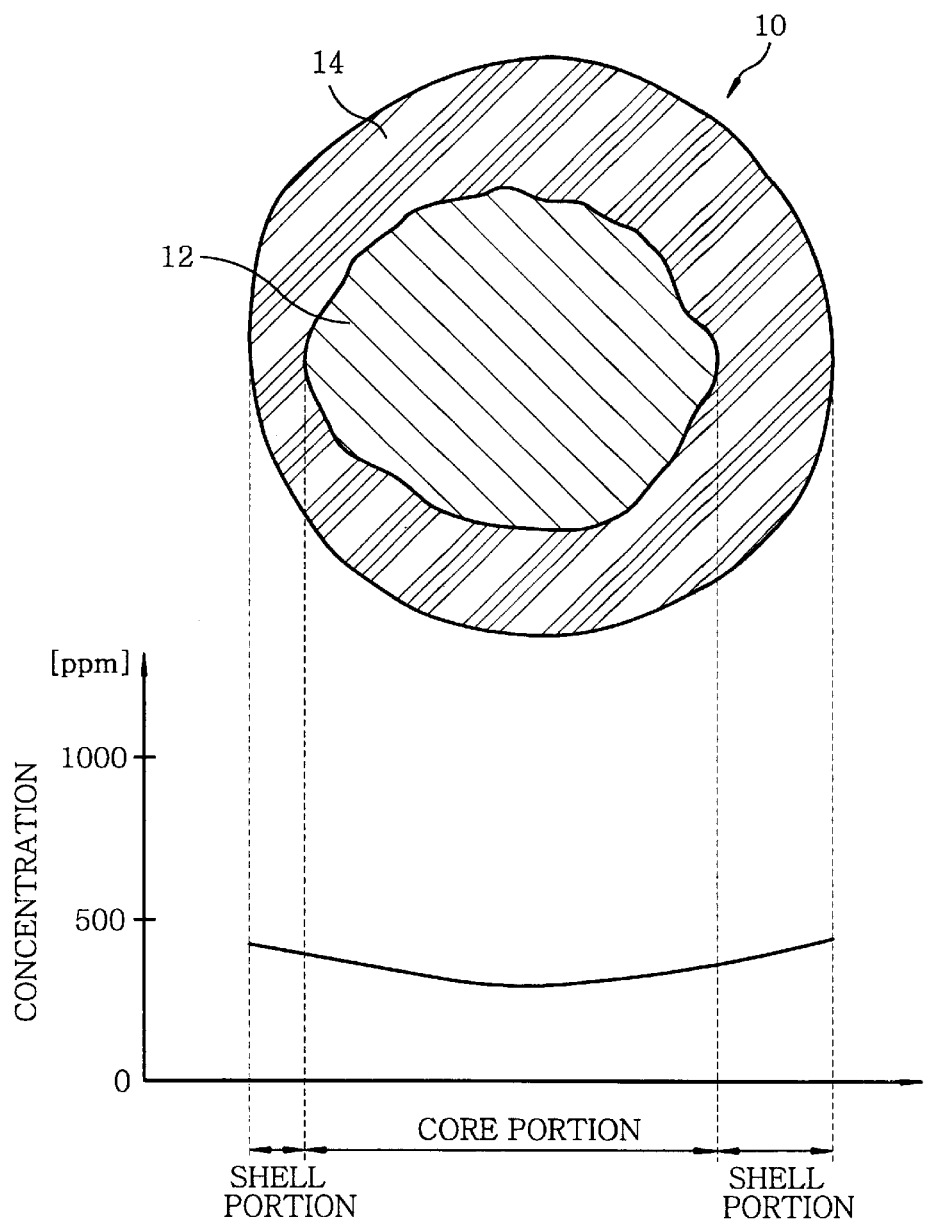
FIG. 1 illustrates the concentration distribution of an acceptor element contained in a ceramic grain incorporated in a dielectric layer of a multilayer ceramic capacitor in accordance with a first embodiment of the present invention.

The preferred embodiments of the present invention will now be described in detail by way of illustration based on the following Examples.

EXAMPLE 1

$BaCO_3$ and $TiO_3$ of the same molar amount were well mixed with a compound of one of such elements as Mn, Cr, V, and Mo, wherein the amount of the compound ranged from 10 to 2000 ppm. The mixture was calcined at 200° C. for two hours. During the calcinations process, $BaCO_3$ chemically reacted with $TiO_2$ to generate $BaTiO_3$ including one of the elements of Mn, V, Cr, and Mo of 10 to 2000 ppm.

Thereafter, MgO, $BaSiO_3$, and an oxide of rare earth element such as Ho, Dy, or Er were added to and mixed with 100 parts by mole of $BaTiO_3$ containing a minute amount of Mn, V, Cr or Mo in a manner shown in Sample Nos. 1 to 11 of Table 1. Other rare earth element, e.g., Sc, Y. Gb, Yb, Tb, Tm or Lu, can be also used in lieu of Ho, Dy or Er employed in this Example. The mixture was then calcined at 1000° C. for two hours. During the calcination, MgO reacted with the $BaTiO_3$, thereby forming a shell portion around the periphery of a $BaTiO_3$ particle. $BaSiO_3$ is a glass component functioning as a sintering flux filling, e.g., voids between ceramic grains in dielectric ceramic layers, during the sintering process to be described hereinafter. The glass component may contain therein Li, B, Si, or the like.

The calcined mixture was mixed again with 15 wt % of an organic binder and 50 wt % of water in a ball mill to form a ceramic slurry, wherein the organic binder includes acrylic ester polymer, glycerin, and a solution of condensed phosphate.

The ceramic slurry was formed into a molded sheet by using a reverse roll coater after undergoing through a vacuum air-separator for removing any contained air. Then the molded sheet was continuously coated on a polyester film and at the same time dried at a temperature of 100° C., thereby forming square ceramic green sheets having a size of 10×10 cm and an average thickness of 5 µm.

10 g of nickel powder having an average diameter of 0.2 µm and 0.9 g of ethylcellulos were dissolved in 9.1 g of butyl carbonyl and stirred in a stirrer for ten hours to form a conductive paste. Thereafter, the conductive paste was printed on one side of a ceramic green sheet to form internal electrode patterns through the use of a screen having fifty patterns of 14 mm×7 mm, and then the printed conductive paste was dried.

Subsequently, eleven ceramic green sheets on which the internal electrode patterns were printed were piled up with the internal electrode patterns facing upward, thereby forming a laminated body. Two corresponding internal electrode patterns provided on two neighboring ceramic green sheets were arranged in such a manner that they are shifted by about a half of one pattern size along the lengthwise. The laminated body also included protective ceramic dummy sheets of 200 µm thickness formed on top and bottom of the laminated body, wherein the protective ceramic dummy sheets had no internal electrode patterns.

Next, the laminated body thus formed was vertically compressed with a load of 40 tons at a temperature of 50° C. Afterwards the pressed laminated body was diced so as to form 50 pieces of chip-shaped ceramic bodies, each having a size of about 3.2×1.6 mm.

Thereafter, a binder removing process was carried out by loading the chip-shaped ceramic bodies into a furnace capable of controlling an atmosphere therein and then the organic binder contained in the loaded ceramic bodies were removed by heating the furnace up to the degree of 600° C. with a heating rate of 100° C./h in air.

Subsequently, the atmosphere of the furnace was altered to the reductive atmosphere by using the process gases of $H_2$ (2 volume %)+$N_2$ (98 volume %). Then the binder-removed bodies were fired to obtain sintered ceramic bodies by increasing the temperature from 600° C. up to 1130° C. with a heating rate of 100° C./h and maintaining the highest temperature of 1130° C. for three hours.

In a following step, the furnace was cooled down to 600° C. with a cooling rate of 100° C./h and then the atmosphere of the furnace then was changed into air atmosphere (oxidative atmosphere). The furnace was sustained for half an hour under the condition having the oxidative atmosphere at the temperature of 600° C., thereby re-oxidizing the sintered ceramic bodies. The furnace was cooled down again to the room temperature to obtain sintered laminated bodies of the multilayer ceramic capacitor.

Finally, the conductive paste composed of Ni, glass frits and a vehicle was coated on two opposite sides of each sintered laminated body, wherein one end portion of each of the internal electrodes was exposed to a corresponding side of the two opposite sides of the sintered laminated body. The coated conductive paste was heat-treated at a temperature of 550° C. in air for 15 minutes so as to form Ni conductive layers. Then copper layers and Pb—Sn soldering layers were successively formed on top of the Ni conductive layers by using an electroless plating and an electroplating method, respectively, thereby obtaining a pair of external electrodes.

Referring to Table 1, there are presented accelerated lives and dielectric constants of the multilayer ceramic capacitors in accordance with the first embodiment of the present invention. The accelerated lives were obtained under the condition of a temperature of 170° C. and an applied voltage of 70 V. The values of the accelerated life in Table 1 are normalized values with respect to the value of the accelerated life of the Sample No. 1. Sample Nos. 1 and 9 are comparative samples where none of Mn, V, Cr. Mo (Sample No.1) or excessive Mn (Sample No. 9) are added to the main substance $BaTiO_3$, respectively.

TABLE 1

| Sample No. | Main Substance | Additive Element (part by mole) | | | Accelerated Life | Dielectric Constant |
| --- | --- | --- | --- | --- | --- | --- |
| | | Oxide of Rare-earth Element | MgO | $BaSiO_3$ | | |
| ✗1 | BT | Ho: 2 | 0.6 | 1.5 | 1 | 3500 |
| 2 | BT/100 ppm Mn | " | " | " | 2.3 | 3530 |
| 3 | V | " | " | " | 2.6 | 3480 |
| 4 | Cr | " | " | " | 1.9 | 3600 |
| 5 | Mo | " | " | " | 2.1 | 3550 |
| 6 | BT/50 ppm Mn | " | " | " | 1.6 | 3620 |
| 7 | 500 ppm Mn | " | " | " | 3.0 | 3510 |
| 8 | 1000 ppm Mn | " | " | " | 3.1 | 3420 |
| ✗9 | 2000 ppm Mn | " | " | " | 2.0 | 3300 |
| 10 | 500 ppm V | Dy: 1.8 | " | " | 3.1 | 3800 |
| 11 | 500 ppm Mo | Er: 2.2 | " | " | 2.1 | 3490 |

The mark of "✗" refers to comparative samples.

FIG. 1 shows an analysis result obtained by using a STEM (Scanning Transmission Electron Microscope) from a representative ceramic grain 10 found in the dielectric layers of a multilayer ceramic capacitor (e.g., Sample No. 7) fabricated as described above in accordance with the first embodiment of the present invention. The ceramic grain 10 has a core portion 12 and a shell portion 14 surrounding the core portion 12, wherein the additive element Mn is non-uniformly distributed in the core portion 12 and the shell portion 14. The concentration of Mn continuously increases as moving away from the center of the core portion 12 to the outer surface of the shell portion 14.

EXAMPLE 2

Pre-synthesized 100 parts by weight of $BaTiO_3$ and 0.4 parts by weight of MgO were fully mixed with each other and heat-treated for two hours at a temperature ranging from 900 to 1100° C. During the heat treatment, MgO reacted with the $BaTiO_3$, thereby forming a shell portion around the periphery of a $BaTiO_3$ particle.

Thereafter 1.6 parts by weight of an oxide of one or more rare earth elements (selected from, e.g., Ho, Sc, Y. Gd, Dy, Er, Yb, Tb, Tm and Lu), 0.06 parts by weight of a compound of one or more acceptor type elements (selected from Mn, V, Cr and Mo), and 0.05 parts by weight of a glass component (including Li, B. Si, or the like) were added to and mixed with the 100 parts by weight (1000 g) of $BaTiO_3$ reacted with MgO as illustrated in Sample Nos. 12 to 15 in Table 2. Afterwards, the mixture was mixed with the binder as in the previous Example. The remaining procedure was the same as that in the Example of the first embodiment.

Table 2 presents the accelerated lives and dielectric constants of the multilayer ceramic capacitors in accordance with the second embodiment, wherein the accelerated lives ware obtained under the condition of 125° C. and 50 V.

TABLE 2

| Sample No. | Rare-earth Element | Acceptor Element | Dielectric Constant | Accelerated Life (sec) |
|---|---|---|---|---|
| 12 | Ho | Mn | 3,350 | 55,000 |
| 13 | Ho | V | 3,450 | 65,000 |
| 14 | Ho | Cr | 3,450 | 60,000 |
| 15 | Ho | Co | 3,400 | 60,000 |
| 16 | Ho | Mo | 3,500 | 70,000 |
| 17 | Se | Mn | 3,500 | 60,000 |
| 18 | Y | Mn | 3,350 | 55,000 |
| 19 | Gd | Mn | 3,400 | 50,000 |
| 20 | Dy | Mn | 3,350 | 60,000 |
| 21 | Er | Mn | 3,350 | 60,000 |
| 22 | Yb | Mn | 3,300 | 50,000 |
| 23 | Tb | Mn | 3,450 | 55,000 |
| 24 | Tm | Mn | 3,500 | 50,000 |
| 25 | Lu | Mn | 3,550 | 50,000 |
| ✕26 | Ho | Mn | 3,200 | 32,000 |

The mark of "✕" refers to a comparative sample.

Figure 2:
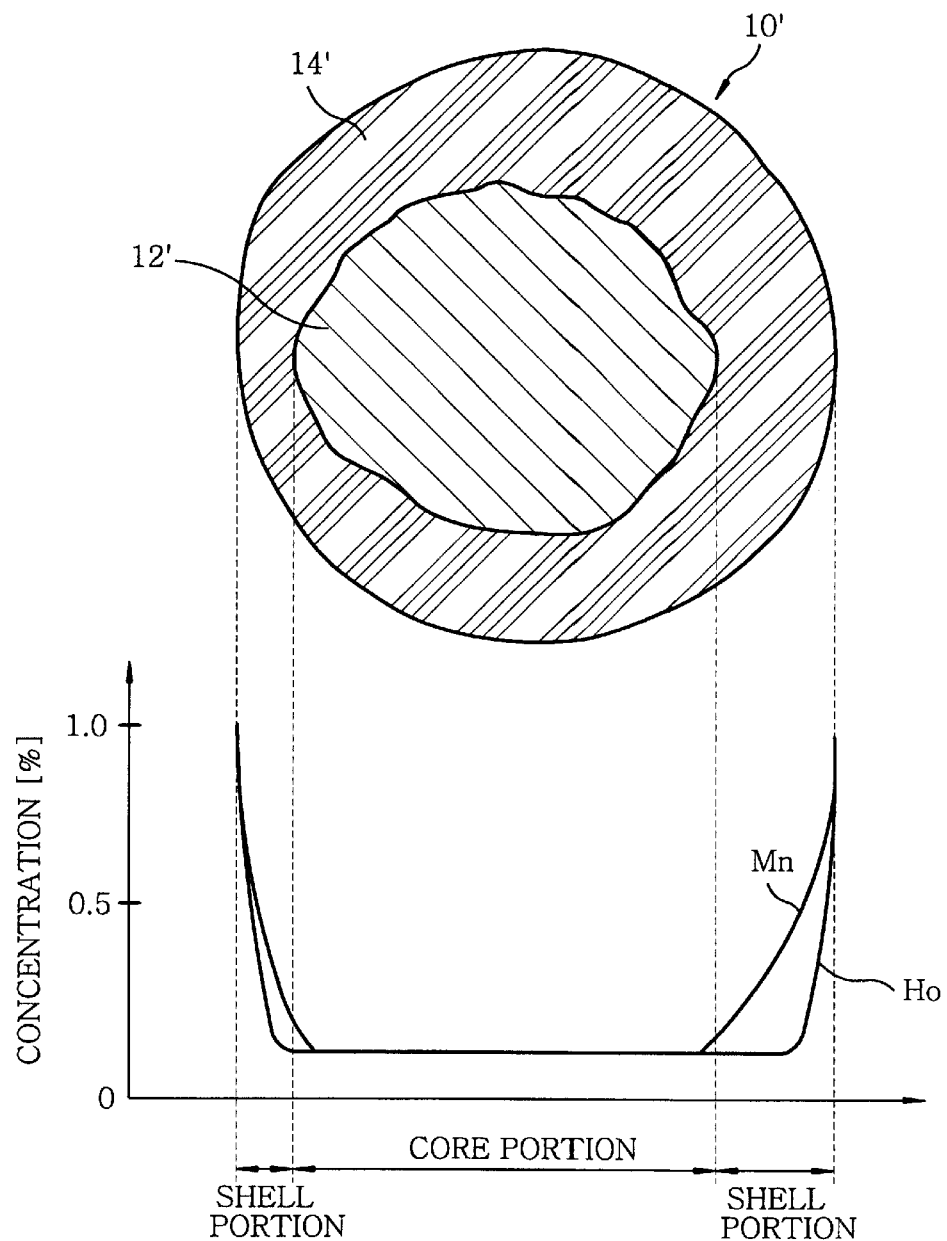
FIG. 2 depicts the concentration distribution of an acceptor element and a rare earth element contained in a ceramic grain of a dielectric layer in a multilayer ceramic capacitor in accordance with a second embodiment of the present invention.

FIG. 2 depicts an analysis result obtained by using the STEM from a representative ceramic grain 10' in the dielectric layers of a multilayer ceramic capacitor (Sample No. 12) fabricated as described above in accordance with the second embodiment of the present invention. The ceramic grain 10' includes a core portion 12' surrounded by a shell portion 14', wherein Mg contained in the shell portion 14 restraints the additive elements such as the rare earth elements and the acceptor element from diffusing into the core portion 12' of the ceramic grain 10' The concentrations of the additive elements increases as moving away from the boundary between the core and the shell portion 12' and 14' to the surface of the ceramic grain 10'.

Referring to Table 2, Sample No. 26 is a comparative sample where MgO was just mixed with $BaTiO_3$ and the compounds of rare earth elements and acceptor element to form the ceramic slurry without being subjected to the sintering process together with $BaTiO_3$, elg., for 2 hours at 900 to 1100° C. to form the core-shell structure shown in FIG. 2. The concentration gradient, where the concentration of the additive elements increases as moving away from the boundary between the core and the shell portion to the surface of the ceramic grain as shown in FIG. 2, cannot be obtained from the comparative Sample No. 26 since $BaTiO_3$ do not have MgO at its shell portion, resulting in deteriorated operating life of the multilayer ceramic capacitor.

EXAMPLE 3-1

69.7 parts by weight of $BaCO_3$, 24.3 parts by weight of $TIO_3$ and 6.1 part by weight of $ZrO_2$ were fully mixed and then heat treated at a temperature ranging from 1000° C. to 1200° C. for 3 hours. In the above process, a single-phase solid solution represented as $Ba(Ti,Zr)O_3$ having a perovskite structure was obtained from the reaction of $BaCO_3$, $TiO_2$ and $ZrO_2$.

Thereafter, 100 wt part (1000 g) of $Ba(Ti,Zr)O_3$ was mixed with an oxide of rare-earth element (selected from, e.g., Ho, Sc, Y, Gd, Dy, Er, Yb, Tb, Tm, and Lu), a compound of acceptor element (selected from, e.g., Mn, V, Cr, Co, Fe, Cu, Ni and Mo) and a glass component (including Li, B, Si, or the like) as shown in Sample Nos. 27 to 40 in Table 3.

In each of Sample Nos. 27 to 40, 1.6 parts by weight of $Ho_2O_3$ as the oxide of rare-earth element, 0.08 parts by weight of MnO as the oxide of acceptor element, and 1.0 parts by weight of glass component were mixed. The mixture thus obtained was mixed with an organic binder and water to form a ceramic slurry as in Example 1. The remaining procedure to obtain multilayer ceramic capacitors was same as that in the Example 1.

Table 3 represents measured results of the accelerated lives and the dielectric constants thus obtained of the dielectric layers of the multilayer ceramic capacitor. The accelerated lives were obtained under the condition of 125° C. and 50 V. Sample No. 41 was made for the sake of comparison with the other samples (Sample Nos. 27 to 40) of the third embodiment, where the mixture of $BaCO_3$, $TiO_2$ and $ZrO_2$ in lieu of $Ba(Ti,Zr)O_3$ were mixed with the oxides of rare-earth element and the acceptor element, an organic binder and water to form the ceramic slurry.

TABLE 3

| Sample No. | Rare-earth Element | Acceptor Element | Dielectric Constant | Failure in Insulation Resistance (IR) (%) | Accelerated Life (sec) |
|---|---|---|---|---|---|
| 27 | Ho | Mn | 10300 | 0 | 3,000 |
| 23 | Ho | V | 10000 | 0 | 4,200 |
| 29 | Ho | Cr | 10500 | 0 | 2,800 |
| 30 | Ho | Co | 9900 | 0 | 2,600 |
| 31 | Ho | Mo | 10100 | 0 | 4,500 |
| 32 | Sc | Mn | 10600 | 0 | 3,300 |
| 33 | Y | Mn | 10200 | 0 | 2,900 |
| 34 | Gd | Mn | 11000 | 0 | 2,200 |
| 35 | Dy | Mn | 11000 | 0 | 3,400 |
| 36 | Er | Mn | 9700 | 0 | 2,800 |
| 37 | Yb | Mn | 9200 | 0 | 2,700 |
| 33 | Tb | Mn | 9300 | 0 | 2,600 |
| 39 | Tm | Mn | 9100 | 0 | 2,600 |
| 40 | Lu | Mn | 9000 | 0 | 2,500 |
| ✕41 | Ho | Mn | 11500 | 50 | 1,300 |

The mark of "✕" refers to comparative sample.

Example 3-2

Ceramic raw materials of 67.3 parts by weight of $BaCO_3$, 1.8 parts by weight of $CaCO_3$, 24.7 parts by weight of $TiO_2$ and 6.2 parts by weight of $ZrO_2$ were mixed and subjected to an identical procedure as in the Example 3-1. Table 4 represents measured results for Sample Nos. 42 to 55 thus fabricated. Sample No. 56 is a comparative example where the mixture of $BaCO_3$, $CaCO_3$, $TiO_2$ and $ZrO_2$ was used in lieu of a solid solution thereof to form the ceramic slurry as in the Example 3-1.

An alternative experiment was carried out by replacing $CaCO_3$ in the Example 3-2 with $SrCO_3$ or $MgCO_3$, and it was found that the results therefrom were similar to those of Sample Nos. 42 to 55 in Table 4.

TABLE 4

| Sample No. | Rare-earth Element | Acceptor Element | Dielectric Constant | Failure in IR (%) | Accelerated Life (sec) |
|---|---|---|---|---|---|
| 42 | Ho | Mn | 10100 | 0 | 3,300 |
| 43 | Ho | V | 9900 | 0 | 4,500 |
| 44 | Ho | Cr | 10200 | 0 | 3,000 |
| 45 | Ho | Co | 9700 | 0 | 3,100 |
| 46 | Ho | Mo | 10000 | 0 | 4,900 |
| 47 | Sc | Mn | 10400 | 0 | 3,200 |
| 48 | Y | Fe | 10600 | 0 | 3,000 |
| 49 | Gd | Mn | 10500 | 0 | 2,500 |
| 50 | Dy | Cu | 9600 | 0 | 3,400 |
| 51 | Er | Mn | 9000 | 0 | 3,100 |
| 52 | Yb | Ni | 9500 | 0 | 2,900 |
| 53 | Tb | Mn | 9100 | 0 | 2,800 |
| 54 | Tm | Mn | 8900 | 0 | 2,800 |
| 55 | Lu | Mn | 8900 | 0 | 2,600 |
| ✗56 | Ho | Mn | 11400 | 50 | 1,050 |

The mark of "✗" refers to a comparative sample.

Figure 3:
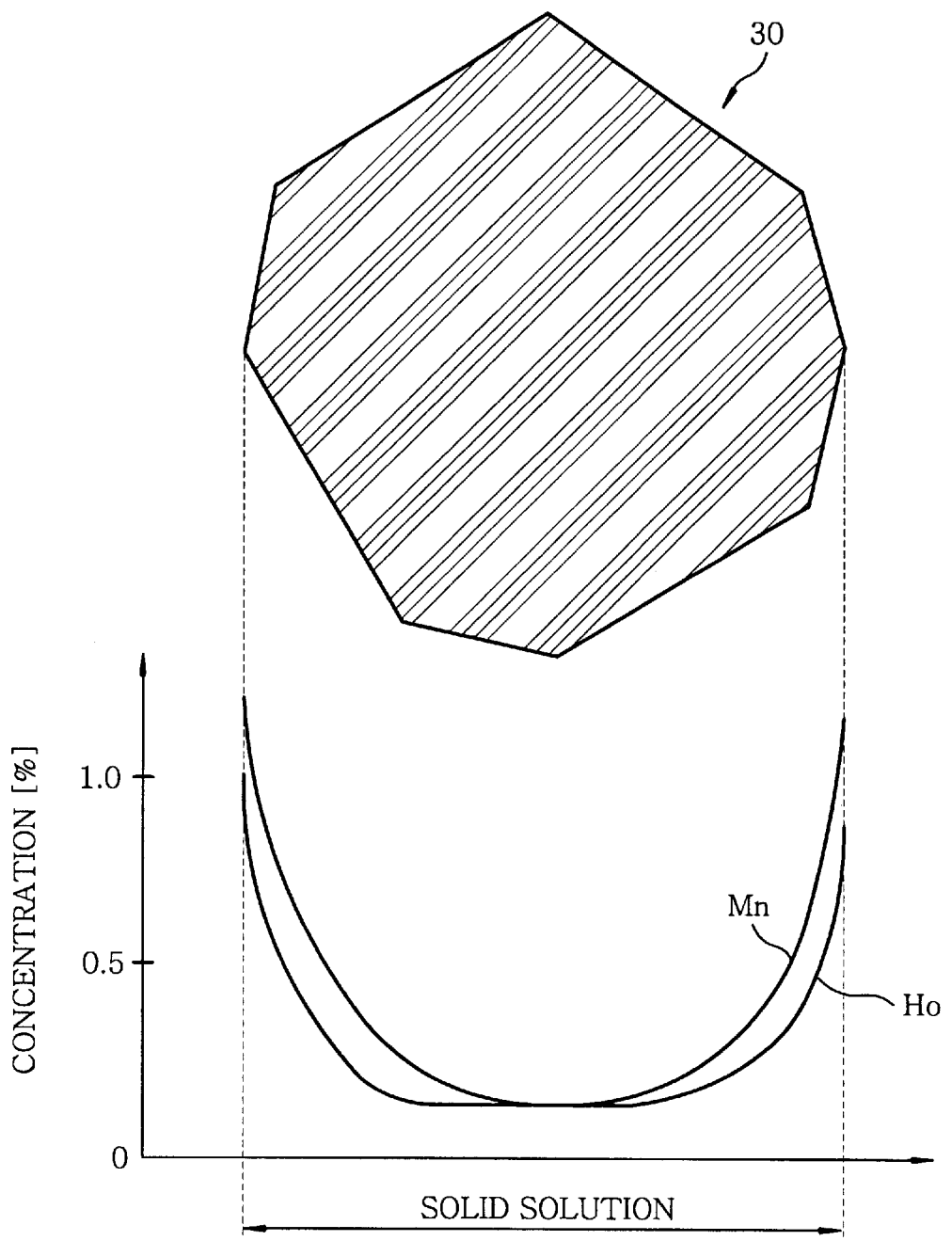
FIG. 3 describes the concentration distribution of an acceptor element and a rare earth element contained in a ceramic grain of a dielectric layer of a multilayer ceramic capacitor in accordance with a third embodiment of the present invention.
Figure 4:
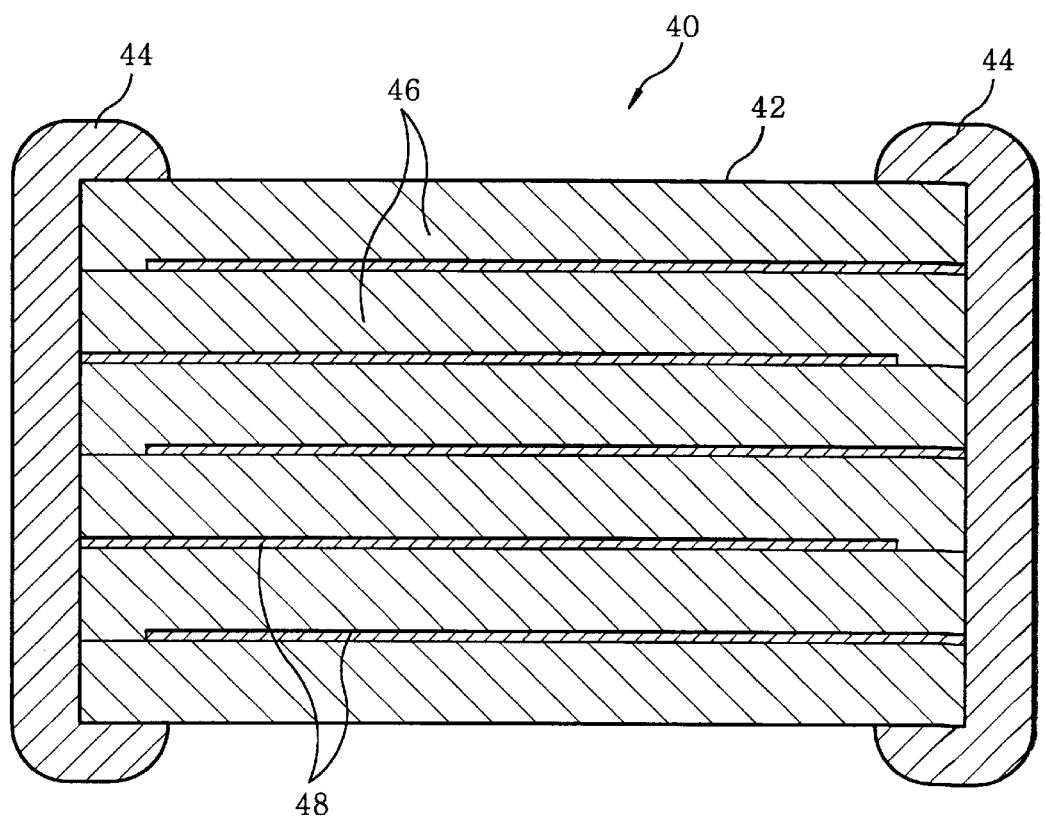
FIG. 4 represents a schematic cross sectional view illustrating a multilayer ceramic capacitor.

FIG. 3 represents a STEM measurement result showing concentration gradients of the rare-earth element and the acceptor element contained in a ceramic grain 30 of the dielectric layers of a multilayer ceramic capacitor (Sample No. 27 or 42) fabricated as described above in accordance with the third embodiment of the present invention. The concentrations of the rare-earth element and the acceptor element are continuously increased as moving away from the center to the surface of the ceramic grain 30.

It should be noted that the dielectric layers of the multilayer ceramic capacitors can be made of a reduction resistive composition including therein other ceramic material than $BaTiO_3$ as main component thereof.

It should be also appreciated that the major component of the conduction paste to be used in forming internal electrodes can be Pd or Ag—Pd instead of Ni used in the preferred embodiments of the present invention.

In accordance with the first and the second preferred embodiments of the present invention, ceramic grains incorporated in dielectric layers of multilayer ceramic capacitors preferably include a core and a shell portion encapsulating the core portion. The concentration of such additive elements as one or more acceptor element, e.g., Mn, V, Cr, Mo, Fe, Ni, Cu, Co, and/or one or more rare-earth elements, e.g., Ho, Sc, Y, Gd, Dy, Er, Yb, Tb, Tm, Lu, is continuously increased as moving away either from the middle point of the core portion to the surface of the ceramic grain (Example 1) or from the boundary between the core and the shell portion to the surface of the ceramic grain (Example 2). Additionally, in case of the ceramic grains being of a solid solution (Example 3-1 and 3-2), the concentration of the additive elements is continuously increased as moving away from the middle point to the surface of the ceramic grain. Such non-uniform distribution of the additive elements, especially the acceptor elements, in ceramic grains promotes or facilitates the re-oxidation process of the ceramic grains and also increases electrical resistance thereof. Accordingly, the operating life characteristics of the multilayer ceramic capacitors, especially those incorporating therein thin dielectric layers, can be improved. As a result, the thickness of dielectric layers can be further reduced and a greater number of dielectric layers can be used in forming multilayer ceramic capacitors, enabling miniaturization and large capacitance thereof to be achieved.

While the invention has been shown and described with respect to the preferred embodiments, it will be understood by those skilled in the art that various changes and modifications may be made without departing from the spirit and scope of the invention as defined in the following claims.

What is claimed is:

1. A multilayer ceramic capacitor comprising:
    a plurality of dielectric layers;
    a multiplicity of internal electrodes alternately stacked with the dielectric layers; and
    a pair of external electrodes connected to the internal electrodes, wherein the dielectric layers include ceramic grains, the ceramic grains having a main component and one or more additive elements, the additive elements being non-uniformly distributed in the ceramic grains,
    wherein each of the ceramic grains has a crystalline core portion and a shell portion surrounding the crystalline core portion and
    wherein a concentration of the additive elements continuously increases as moving away from the center of the core portion to the boundary between the core portion and the shell portion.

2. The capacitor of claim 1, wherein the dielectric layers are made of a sintered material including barium titanate as the main component.

3. The capacitor of claim 1, wherein the concentration of the additive elements increases as moving away from the boundary between the core portion and the shell portion to the outer surface of the shell portion.

4. The capacitor of claim 3, wherein the shell portion contains Mg.

5. The capacitor of claim 1, wherein the ceramic grains are of a solid solution.

6. The capacitor of claim 5, wherein the concentration of the additive elements increases as moving away from the center to the outer surface of each of the ceramic grains.

7. The capacitor of claim 5, wherein the ceramic grains contain Zr.

8. The capacitor of claim 1, wherein the additive elements include one or more acceptor elements selected from the group consisting of Mn, V, Cr, Mo, Fe, Ni, Cu and Co.

9. The capacitor of claim 1, wherein the additive elements include one or more rare-earth elements selected from the group consisting of Ho, Sc, Y, Gd, Er, Yb, Tb, Tm, Dy and Lu.

10. The capacitor of claim 1, wherein voids between the ceramic grains are filled with a glass component.

11. A method for manufacturing the multilayer ceramic capacitor of claim 1, comprising the steps of:
    preparing a ceramic material having the main component and the additive elements, the additive elements being distributed inside of the main component;
    forming ceramic green sheets by using the prepared ceramic material;
    coating internal electrode patterns on the ceramic green sheets;
    stacking the ceramic green sheets including the internal electrode patterns;
    dicing the stacked ceramic green sheets to form chip-shaped laminated bodies;
    sintering the chip-shaped laminated bodies; and
    forming the pair of external electrodes on two opposite sides of the chip-shaped sintered laminated bodies.

12. A multilayer ceramic capacitor comprising:
    a plurality of dielectric layers;
    a multiplicity of internal electrodes alternately stacked with the dielectric layers; and a pair of external electrodes connected to the internal electrodes, wherein the dielectric layers include ceramic grains, the ceramic grains having a main component and one or more acceptor elements, the acceptor elements being non-uniformly distributed in the ceramic grains, wherein each of the ceramic grains has a crystalline core portion and a shell portion surrounding the crystalline core portion and wherein a concentration of the acceptor elements continuously increases as moving away from the center of the core portion to the boundary between the core portion and the shell portion.

13. The capacitor of claim 12, wherein said one or more acceptor elements are selected from the group consisting of Mn, V, Cr, Mo, Fe, Ni, Cu and Co.

14. The capacitor of claim 12, wherein said one or more acceptor elements are selected from the group consisting of Mn, V, Mo, Fe, Ni, Cu and Co.

15. The capacitor of claim 12, wherein the concentration of the acceptor elements increases as moving away from the boundary between the core portion and the shell portion to the outer surface of the shell portion.

16. The capacitor of claim 15, wherein the shell portion contains Mg.

17. The capacitor of claim 12, further comprising one or more rare-earth elements are selected from the group consisting of Ho, Y, Gd, Er, Yb, Tb, Tm, Dy and Lu, the rare-earth elements being non-uniformly distributed in the ceramic grains.

18. The capacitor of claim 12, wherein voids between the ceramic grains are filled with a glass component.

* * * * *